United States Patent
Rasale

(10) Patent No.: US 11,789,734 B2
(45) Date of Patent: Oct. 17, 2023

(54) PADDED VECTORIZATION WITH COMPILE TIME KNOWN MASKS

(71) Applicant: Advanced Micro Devices, Inc., Santa Clara, CA (US)

(72) Inventor: Anupama Rajesh Rasale, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 16/537,460

(22) Filed: Aug. 9, 2019

(65) Prior Publication Data

US 2020/0073662 A1  Mar. 5, 2020

(30) Foreign Application Priority Data

Aug. 30, 2018  (IN) .............................. 201811032622

(51) Int. Cl.
*G06F 9/30* (2018.01)
*G06F 9/38* (2018.01)

(52) U.S. Cl.
CPC ...... *G06F 9/30036* (2013.01); *G06F 9/30018* (2013.01); *G06F 9/30043* (2013.01); *G06F 9/30058* (2013.01); *G06F 9/30098* (2013.01); *G06F 9/3887* (2013.01)

(58) Field of Classification Search
CPC .................. G06F 9/30018; G06F 9/30036
See application file for complete search history.

(56) References Cited

U.S. PATENT DOCUMENTS

| | | | |
|---|---|---|---|
| 2004/0054877 A1* | 3/2004 | Macy, Jr. ............ | G06F 9/30036 712/221 |
| 2009/0172365 A1* | 7/2009 | Orenstien ............. | G06F 9/3842 712/225 |
| 2014/0095779 A1* | 4/2014 | Forsyth ................. | G06F 9/3838 711/105 |
| 2014/0095837 A1* | 4/2014 | Plotnikov ............. | G06F 9/3013 712/220 |
| 2014/0115301 A1* | 4/2014 | Sanghai ............... | G06F 9/30065 712/220 |
| 2014/0181467 A1* | 6/2014 | Rogers ................ | G06F 9/30036 712/22 |
| 2014/0281396 A1* | 9/2014 | Jha ....................... | G06F 9/30145 712/208 |
| 2014/0281425 A1* | 9/2014 | Valentine ............ | G06F 9/30036 712/225 |

(Continued)

*Primary Examiner* — Lewis A Bullock, Jr.
*Assistant Examiner* — Theodore E Hebert

(57) ABSTRACT

A computing system includes a processing unit and a memory storing instructions that, when executed by the processor, cause the processor to receive program source code in a compiler, identify in the program source code a set of operations for vectorizing, where each operation in the set of operations specifies a set of one or more operands, in response to identifying the set of operations, vectorize the set of operations by, based on the number of operations in the set of operations and a total number of lanes in a first vector register, generating a mask indicating a first unmasked lane and a first masked lane in the first vector register, based on the mask, generating a set of one or more instructions for loading into the first unmasked lane a first operand of a first operation of the set of operations, and loading the first operand into the first masked lane.

16 Claims, 8 Drawing Sheets

(56) References Cited

U.S. PATENT DOCUMENTS

| | | | | |
|---|---|---|---|---|
| 2016/0041827 A1* | 2/2016 | Corbal | ................ | G06F 9/30018 |
| | | | | 712/5 |
| 2017/0286109 A1* | 10/2017 | Jha | ...................... | G06F 9/30018 |
| 2017/0286112 A1* | 10/2017 | Espasa | ................ | G06F 9/30036 |
| 2019/0004801 A1* | 1/2019 | Haber | ................. | G06F 9/30167 |
| 2019/0196825 A1* | 6/2019 | Grocutt | ............... | G06F 9/30036 |
| 2019/0205138 A1* | 7/2019 | Brown | ................ | G06F 9/30018 |
| 2019/0310847 A1* | 10/2019 | Grocutt | .............. | G06F 9/30036 |
| 2020/0073662 A1* | 3/2020 | Rasale | ................ | G06F 9/30098 |

* cited by examiner

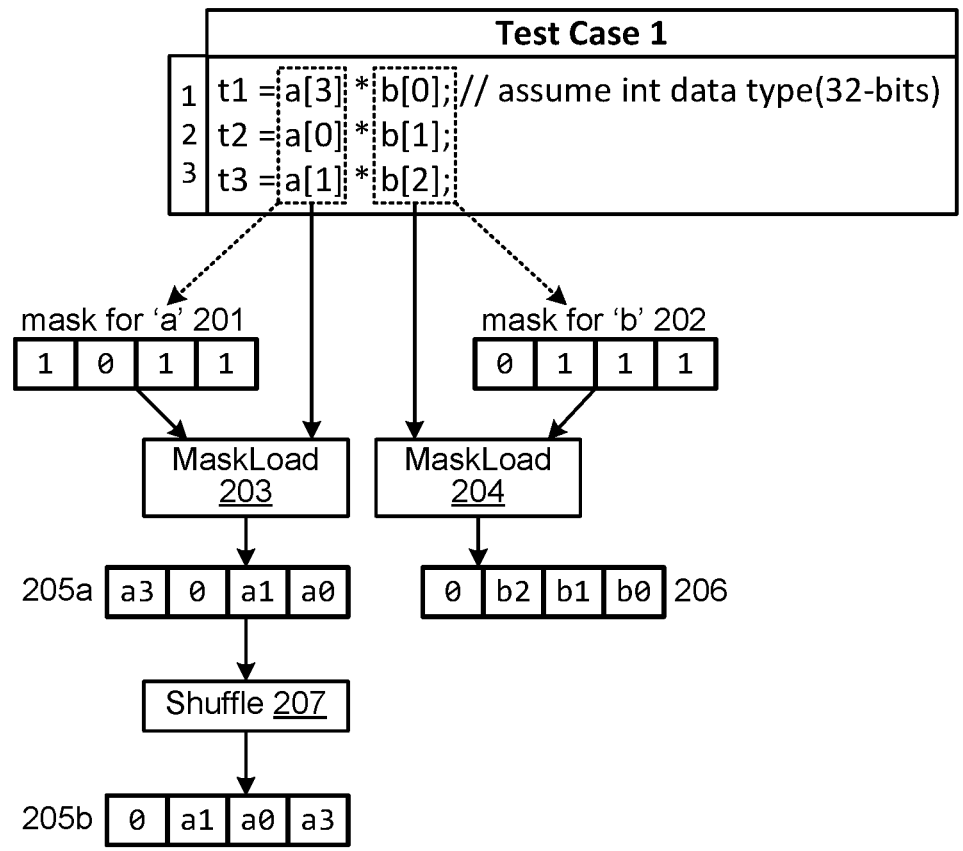
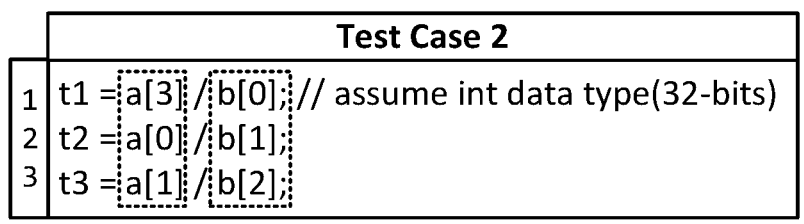
FIGURE 2

PADDED VECTORIZATION WITH COMPILE TIME KNOWN MASKS

RELATED APPLICATIONS

This application claims priority to Indian Provisional Application No. 201811032622, filed on Aug. 30, 2018, which is incorporated by reference herein in its entirety.

BACKGROUND

Many types of modern microprocessors support Single Instruction Multiple Data (SIMD) instructions. SIMD instructions enable microprocessors to exploit data level parallelism. Specifically, a SIMD instruction performs the same identical action simultaneously on two or more pieces of data. There are different ways to utilize the SIMD capabilities of a microprocessor. For example, a programmer can write SIMD assembly language instructions. Alternatively, a compiler can perform autovectorization. Autovectorization is a compiler transformation that automatically generates SIMD instructions for a program loop or a sequentially executing block of instructions. Vectorization of a program allows performance speedup of the application by leveraging the SIMD capabilities of modern microprocessors.

BRIEF DESCRIPTION OF THE DRAWINGS

The present disclosure is illustrated by way of example, and not by way of limitation, in the figures of the accompanying drawings.

FIG. 2 illustrates mask loading of vector registers, according to an embodiment.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

In a modern computing system that supports single instruction multiple data (SIMD) operations, vectorization exploits the SIMD feature of the hardware to perform operations in parallel. A single vector operation works on blocks of consecutive data thus taking less time to complete the task. Vectorization is especially efficient when the data being operated upon is in a sequence such as an array.

Figure 1:
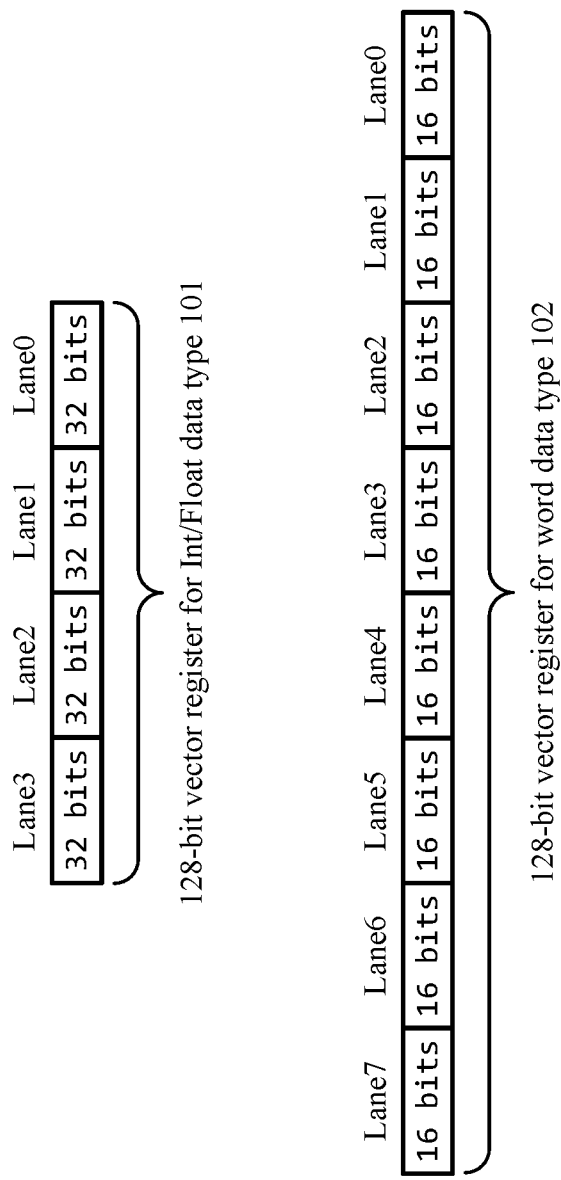
FIG. 1 illustrates multiple lanes in vector registers, according to an embodiment.

FIG. 1 illustrates a 128-bit vector register 101 for integer or float data types and a 128-bit vector register 102 for a word data type. In each vector register, a lane (e.g., Lane0, Lane1, Lane2, etc.) is a unit on which operations are performed. Vector operations (e.g., VADD, VSUB, VMUL, VDIV, VRSQRTPS) operate on all lanes of a vector register. For example, the VPADDD instruction performs vector addition of values in 4 lanes having 32 bits each, and the VPSADBW instruction calculates differences between values in 16 lanes having 8-bits each.

Many central processing units (CPUs) incur no additional penalty for performing vectorized operations for multiple lanes in parallel, as compared to performing the same operation for a single lane. For example, the VADDSD (which adds data in zeroth lane) and VADDPD (adds data in all lanes) operations both have 3-cycle latency. This implies that runtime will improve even when operations are performed with vector registers only partially filled with valid data.

In addition, enabling vectorized operations on partially filled vector registers can reduce branch prediction misses, since vector compares reduce the number of conditional jumps. The penalty for a branch miss can be on the order of tens of cycles, with the exact penalty depending on the branch type and whether or not the instructions are fed from the micro-op cache.

FIG. 2 illustrates two test cases, Test Case 1 and Test Case 2, in which a subroutine is vectorized at a basic block level according to a vectorization technique known as Superword Level Parallelism (SLP) Vectorization. In Test Cases 1 and 2, mask loads are used for loading vector registers. A mask load allows specific lanes of a vector register to be selected for loading with data. Valid data is loaded into the unmasked lanes, while masked lanes are filled with zeros. In Test Case 1, a vector register (shown as 205a and 205b) is loaded with data from array 'a' masked with mask 201. A mask load operation 203 is performed, resulting in a loaded register 205a. A shuffle operation 207 is performed, resulting in a loaded register 205b. A vector register 206 is loaded with values from array 'b' via a mask load 204 with mask 202. The values in all lanes of register 205b are each multiplied with their corresponding respective values in register 206 to calculate the results t1, t2, and t3 in parallel. An extraneous result is also produced from performing the parallel multiplication operation on the zero-filled registers.

Figure 3:
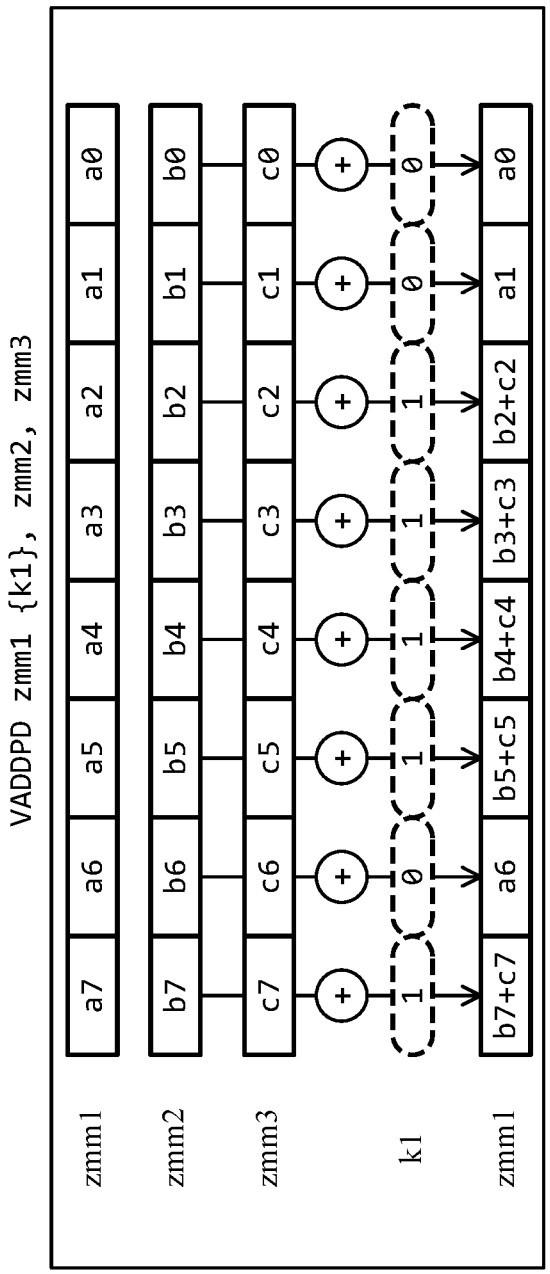
FIG. 3 illustrates vector addition with masking, according to an embodiment.

FIG. 3 illustrates an approach for supporting masked instructions where the masked lanes do not participate in the operations. The vector addition operation VADDPD is performed to add operands in the respective lanes of vector registers zmm2 and zmm3, with the results overwriting existing values in respective lanes of vector register zmm1. The mask k1 indicates which lanes participate in the addition operation.

The above approaches for using mask loading and masked instructions to perform vectorized operations with partially filled vector registers are computationally expensive due to the number of memory loads performed. In Test Case 1, four memory loads are performed: two memory loads for masks 201 and 202 and two memory loads for the arrays 'a' and 'b', followed by a shuffle before carrying out the multiplication operation. In addition, mask loads are not available for byte and word data types in some processors.

Filling masked lanes with zero can also result in SIMD exceptions in some cases. Exceptions could arise from data belonging to any lane. Test Case 2 illustrates one example in which this approach causes an exception. For Test Case 2, the vector registers 205b and 206 are similarly loaded; however, the values in all lanes of vector register 205b are divided by the respective values in vector register 206. The '0' values used to fill the masked lanes cause a divide by zero exception when the vectorized division is performed. As an additional example, vector multiplication could cause overflow or underflow exceptions if these conditions are present in any one lane.

Some operations cause exceptions and can effect flags; for example, VPTEST sets zero, parity etc., flags based on contents of the vector register. When not all of the lanes are filled, such operations are unsafe to perform. Accordingly, compilers such as LLVM, Intel® C++ Compiler (ICC), and GNU Compiler Collection (GCC) do not always enable vectorization if all the lanes are not filled, except in cases where safety is assured (e.g., parallel sum of absolute differences (PSAD), parallel averaging (PAVG) operations). When valid data fills all the lanes of a vector register, exceptions and flag settings are caused by the user data.

Consider the following function from the 526.blender_r benchmark of the SPEC CPU2017 benchmark package, as shown in Subroutine 1 below:

| Subroutine 1: Original Kernel from 526.blender_r |
| --- |
| 1  float t1x = (bb[isec->bv_index[0]] – isec->start[0]) * isec->idot_axis[0]; |
| 2  float t2x = (bb[isec->bv_index[1]] – isec->start[0]) * isec->idot_axis[0]; |
| 3  float t1y = (bb[isec->bv_index[2]] – isec->start[1]) * isec->idot_axis[1]; |
| 4  float t2y = (bb[isec->bv_index[3]] – isec->start[1]) * isec->idot_axis[1]; |
| 5  float t1z = (bb[isec->bv_index[4]] – isec->start[2]) * isec->idot_axis[2]; |
| 6  float t2z = (bb[isec->bv_index[5]] – isec->start[2]) * isec->idot_axis[2]; |
| 7 |
| 8  if (t1x > t2y \|\| t2x < t1y \|\| t1x > t2z \|\| t2x < t1z \|\| t1y > t2z \|\| t2y < t1z) return 0; |
| 9  if (t2x < 0.0f \|\| t2y < 0.0f \|\| t2z < 0.0f) return 0; |
| 10 if (t1x > isec->dist \|\| t1y > isec->dist \|\| t1z > isec->dist) return 0; |
| 11 |
| 12 return 1; |

In the 526.blender_r routine above, there are 12 comparisons, and the function returns either 0 or 1. As expressed above, all comparisons are performed serially. These expressions are rearranged below in Subroutine 2:

| Subroutine 2: Rearranged expressions from 526.blender_r |
| --- |
| 1  float t1x = (bb[isec->bv_index[0]] – isec->start[0]) * isec->idot_axis[0]; |
| 3  float t1y = (bb[isec->bv_index[2]] – isec->start[1]) * isec->idot_axis[1]; |
| 5  float t1z = (bb[isec->bv_index[4]] – isec->start[2]) * isec->idot_axis[2]; |
| 2  float t2x = (bb[isec->bv_index[1]] – isec->start[0]) * isec->idot_axis[0]; |
| 4  float t2y = (bb[isec->bv_index[3]] – isec->start[1]) * isec->idot_axis[1]; |
| 6  float t2z = (bb[isec->bv_index[5]] – isec->start[2]) * isec->idot_axis[2]; |

The vectorization cost analysis for evaluating the expressions in lines 1-6 proceeds as follows: the isec→start and isec→idot_axis operations have consecutive accesses, the isec→bv_index are the indices, and the 'bb' accesses are random. There are 4 arrays to calculate six expressions and only one array accesses memory in random; therefore, vectorization is beneficial.

| Subroutine 3: Comparison order expressed as > or < |
| --- |
| 8  if (t1x > t2y \|\| t1y > t2x \|\| t1z > t2y \|\| t1x > t2z \|\| t1y > t2z \|\| t1z > t2x ) return 0; |
| 9  if (t2x < 0.0f \|\| t2y < 0.0f \|\| t2z < 0.0f) return 0; |
| 10 if (t1x > isec->dist \|\| t1y > isec->dist \|\| t1z > isec->dist) return 0; |

Vector factors are deduced from the comparison sequence in the kernel, as shown in Subroutine 3. In Subroutine 3, line 8 has a triad of comparisons: t1x with t2z and t2y, t1y with t2x and t2z, and t1z with t2x and t2y. Line 9 has a triad of comparisons: each of t2x, t2y, and t2z is compared with zero. Line 10 has a triad of comparisons: t1x, t1y, and t1z are each compared with isec→dist.

Lines 1, 3 and 5 can be computed using one vector register, and so can lines 2, 4 and 6. With 32-bit data elements, filling all four lanes of a 128-bit vector register would take 4 floating point values, but efficiently vectorizing the above comparisons is accomplished with three values per vector register. Loading only 3 data values in a 4 lane vector register using a mask load fills unused lanes with zero. However, the zero filled lanes in the vector register means that the subsequent comparisons are performed serially for an accurate result, which defeats the vectorization.

Figure 4:
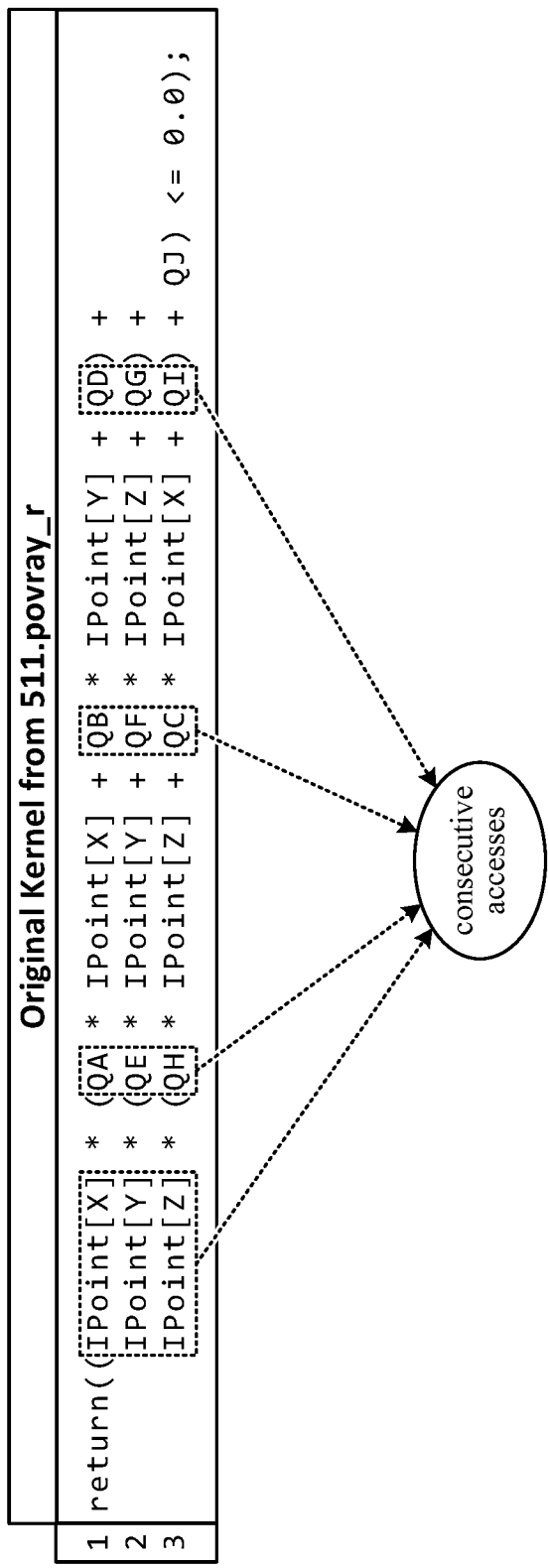
FIG. 4 illustrates consecutive accesses in a subroutine, according to an embodiment.

FIG. 4 illustrates a kernel from the 511.povray benchmark of the SPEC CPU2017 benchmark package that is inefficiently vectorized. The variables in this routine are double precision floating point values. A 256-bit vector register for double precision floating point values is filled when it contains 4 values. However, the kernel in FIG. 4 operates on a 3-dimensional space and thus has consecutive accesses (as indicated in FIG. 4) in multiples of three. This situation arises frequently in applications working on 3-dimensional data such as image processing or 3-dimensional rendering, presenting many opportunities for 3-way vectorization.

In one embodiment, unused masked lanes in a vector register are filled with valid data values from the unmasked lanes. This approach addresses the issues (shown in Subroutines 1-3) and safely vectorizes both expression calculation and comparison, thus reducing branch misses.

Figure 5:
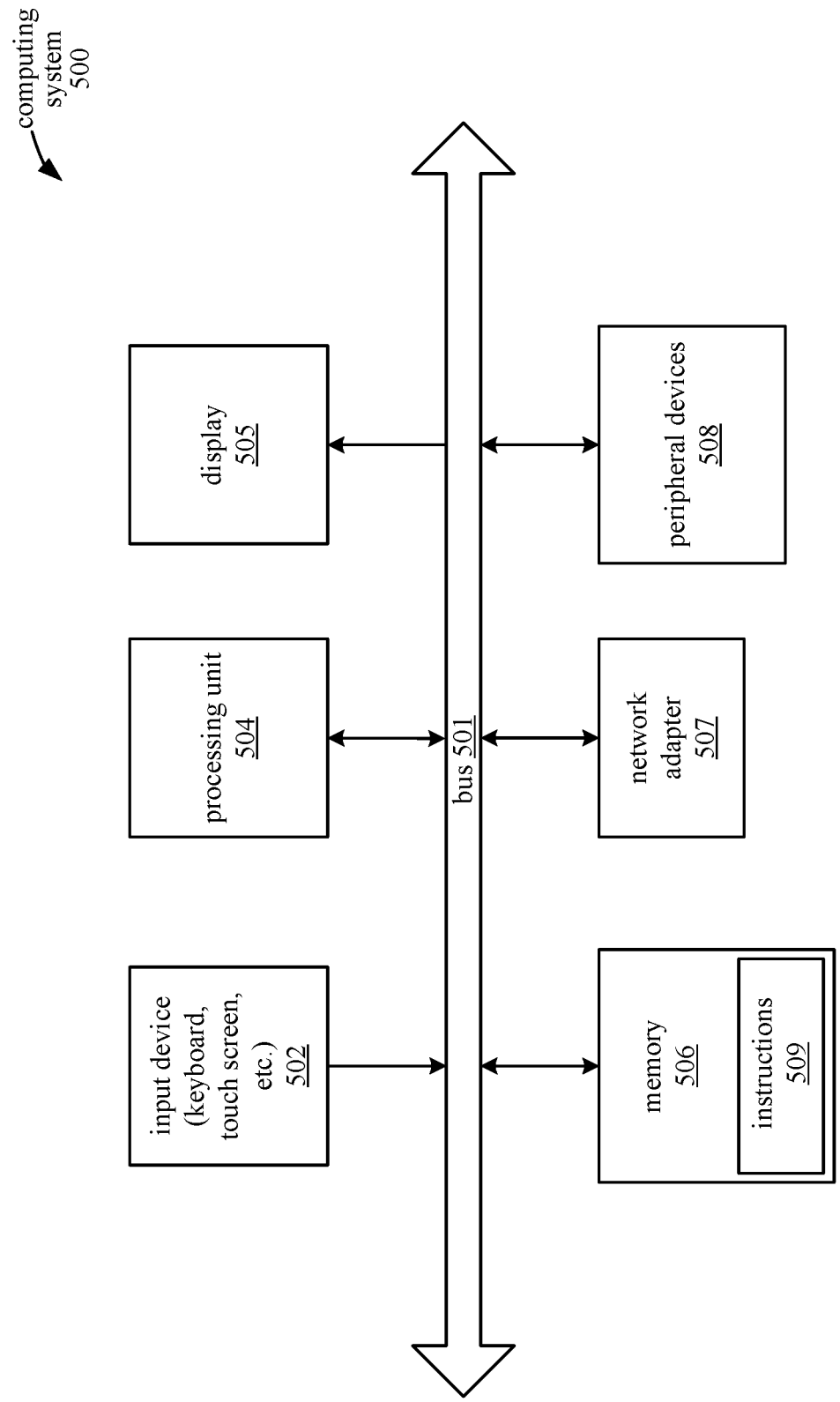
FIG. 5 illustrates a computing system, according to an embodiment.

FIG. 5 illustrates an embodiment of a computing system 500 in which performing vector operations on partially filled vector registers is enabled by filling the masked lanes with valid data from unmasked lanes. In general, the computing system 500 is embodied as any of a number of different types of devices, including but not limited to a laptop or desktop computer, mobile device, server, network switch or router, etc. The computing system 500 includes a number of hardware resources, including components 502-508, which communicate with each other through a bus 501. In computing system 500, each of the components 502-508 is capable of communicating with any of the other components 502-508 either directly through the bus 501, or via one or more of the other components 502-508. The components 501-508 in computing system 500 are contained within a single physical enclosure, such as a laptop or desktop chassis, or a mobile phone casing. In alternative embodiments, some of the components of computing system 500 are embodied as external peripheral devices such that the entire computing system 500 does not reside within a single physical enclosure.

The computing system 500 also includes user interface devices for receiving information from or providing information to a user. Specifically, the computing system 500 includes an input device 502, such as a keyboard, mouse, touch-screen, or other device for receiving information from the user. The computing system 500 displays information to the user via a display 505, such as a monitor, light-emitting diode (LED) display, liquid crystal display, or other output device.

Computing system 500 additionally includes a network adapter 507 for transmitting and receiving data over a wired or wireless network. Computing system 500 also includes one or more peripheral devices 508. The peripheral devices 508 may include mass storage devices, location detection devices, sensors, input devices, or other types of devices used by the computing system 500. Memory system 506 includes memory devices used by the computing system 500, such as random-access memory (RAM) modules, read-only memory (ROM) modules, hard disks, and other non-transitory computer-readable media.

Computing system 500 includes a processing unit 504. In one embodiment, the processing unit 504 includes multiple processing cores that reside on a common integrated circuit substrate. The processing unit 504 receives and executes instructions 509 that are stored in a memory system 506. At least a portion of the instructions 509 defines a compiler program that receives program source code (e.g., for an application) and compiles the source code to generate a set of instructions for the program that are executable by the processing unit 504. The compiling process includes identifying a set of operations as candidates for vectorization, and generating a mask and instructions for loading operands for the operations into vector registers, where unused masked lanes in the vector registers are filled with valid operand values from the unmasked lanes.

Some embodiments of computing system 500 may include fewer or more components than the embodiment as illustrated in FIG. 5. For example, certain embodiments are implemented without any display 505 or input devices 502. Other embodiments have more than one of a particular component; for example, an embodiment of computing system 500 could have multiple processing units 504, buses 501, network adapters 507, memory systems 506, etc.

Subroutines 4, 5, and 6 below show program source code for three candidate test cases, for loop vectorization, epilog vectorization and SLP level vectorization.

| Subroutine 4: Loop vectorization candidate |
| --- |
| 1     for ( i = 0 ; i < 3; i++) |
| 2         a[i] = b[i]/c[i]; |

| Subroutine 5: Epilog vectorization candidate |
| --- |
| 1     // Assuming LV VF=4, remainder loop(VF=3) can also be //vectorized with Padded |
| 2     Vectorization |
| 3     for ( i = 0 ; i < 7; i++) |
| 4         a[i] = b[i]/c[i]; |

| Subroutine 6: SLP level vectorization candidate |
| --- |
| 1     t1 = b[0]/c[3] * x[0]/y[0]; |

| Subroutine 6: SLP level vectorization candidate |
| --- |
| 2     t2 = b[1]/c[1] * x[1]/y[1]; |
| 3     t3 = b[2]/c[0] * x[2]/y[2]; |
| 4     t4 = b[3]/c[3] * x[3]/y[3]; |
| 5     t5 = b[4]/c[4] * x[4]/y[4]; |
| 6     t6 = b[5]/c[5] * x[5]/y[5]; |
| 7     if(t1 <= t4 || t2 <= t5 || t3 <= t6) return 0; |
| 8     return 1; |

In one embodiment, vectorization of these cases is accomplished by using the unmasked user supplied data values to fill the masked lanes. This approach supports vectorization of data sizes VF that are not powers of 2, such as VF=3, 5, etc. This helps vectorization in many applications that work on 3-dimensional data space. In one embodiment, the lanes to be masked are known at compile time, and valid data is placed in the masked lanes so that no exception is generated from this data as a result of vectorization. The safest valid data is data from the unmasked lanes. Placing the valid unmasked lane data in the masked lane is achieved via a padded vector load and/or padded shuffle load. The padded vector load and padded shuffle load are achieved using 1-cycle latency instructions. Because the unused lanes are filled with valid data, no unreferenced memory is accessed. The above technique also helps to reduce costly branch misses by enabling the usage of vector compares, thus saving power and improving runtime performance.

Figure 6:
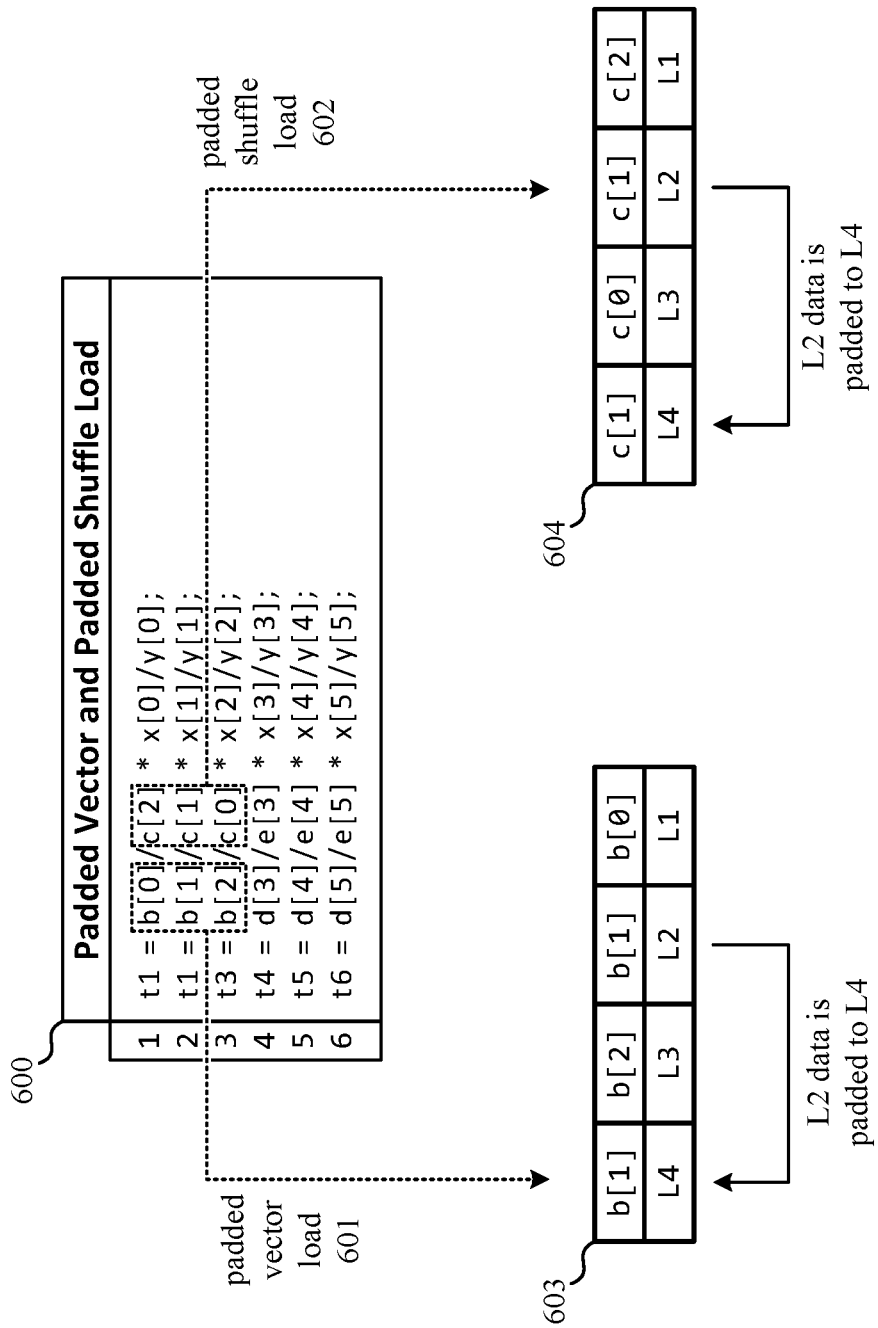
FIG. 6 illustrates a padded vector load and a padded shuffle load, according to an embodiment.

FIG. 6 illustrates a subroutine 600 in which padded vector load 601 and padded shuffle load 602 instructions are used to load lanes in vector registers 603 and 604, according to an embodiment. In vector register 603, valid data values b[0], b[1], and b[2] are loaded respectively into the unmasked lanes L1, L2, and L3; the masked lane L4 is filled with a value b[1] copied from one of unmasked lanes L2. The padded shuffle load 602 loads valid data values c[0], c[1] and c[2] in the order c[2],c[1] and c[0] using a single instruction. In vector register 604, values c[2], c[1], and c[0] are loaded respectively into the unmasked lanes L1, L2, and L3; the masked lane L4 is filled with a value c[1] copied from one of unmasked lanes L2.

One unmasked lane position is chosen (e.g., randomly) for filling all of the masked lane positions and the same position is used for all loads. In the example shown in FIG. 6, data is copied from L2 to the masked lane (L4) in both of the vector registers 603 and 604. Alternatively, data could be copied from L1 or L3. The padded shuffle load 602 and padded vector load 601 are achieved using a PERMUTE instruction or a SHUFFLE instruction. PERMUTE and SHUFFLE are 1-cycle latency instructions.

Figure 7:
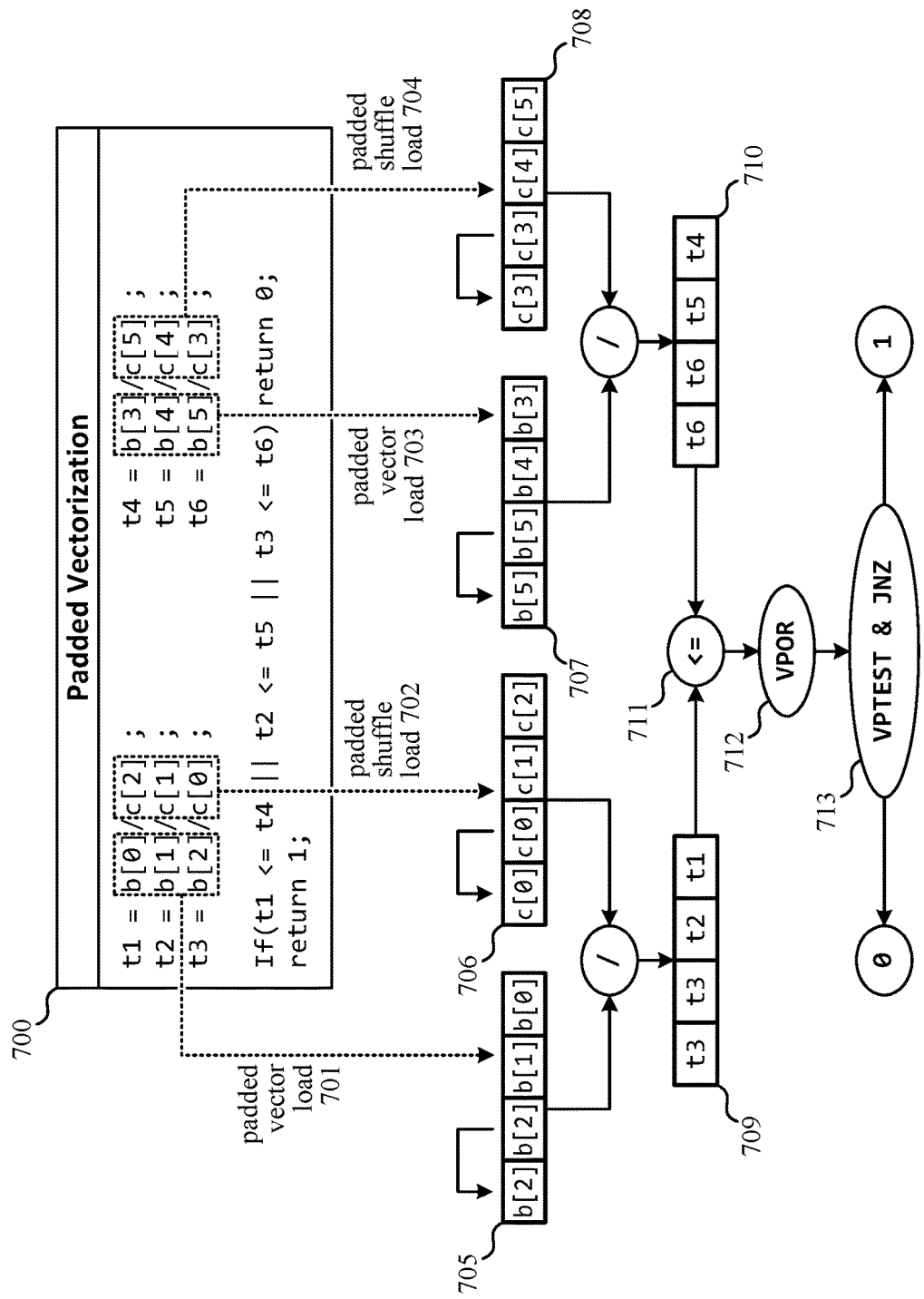
FIG. 7 illustrates the reduction of branch misses by padded vectorization, according to an embodiment.

FIG. 7 illustrates a subroutine 700 in which values from unmasked lanes are used to fill masked lanes in vector registers, according to an embodiment. In each of the vector registers 705, 706, 707, and 708, the lanes L1, L2, L3, and L4 are ordered from right to left, as illustrated in FIG. 7. Padded vector load operations 701 and 703 are used to load vector registers 705 and 707, respectively. Padded shuffle load operations 702 and 704 are used to load vector registers 706 and 708, respectively. The padded shuffle load operations 702 and 704 reorder the values from the 'b' and 'c' arrays to match the orders of the corresponding operands in vector registers 705 and 707, respectively, as specified in the subroutine 700.

In each of the registers 705-708, the masked L4 position is filled with a value copied from position L3. Vector division is performed to divide each value in registers 705 by a corresponding value in register 706. The result is shown in vector register 709. A valid result 't3' is obtained in the L4 position of register 709 by dividing the filled values in the L4 positions (i.e., b[2]/c[2]); since the L4 positions in registers 705 and 706 are not filled with zeros, a divide by zero exception is avoided. The result in vector register 710 is similarly obtained by performing a vector division operation between registers 707 and 708.

A vectorized compare operation 711 (i.e., less than or equal) is performed on the results 709 and 710. Each of the values t1-t3 in register 709 is compared with its respective value t4-t6 in the corresponding lane of register 710. A VPOR (bitwise logical OR) operation 712 is performed on the result, which evaluates whether any of the lane comparisons was evaluated to be true. A VPTEST (logical compare) and JNZ (jump if not zero) operation 713 tests the result of the VPOR, returning '0' if the VPOR result is asserted, and otherwise returning '1'. In FIG. 7, three serial comparisons and jumps are thus reduced to one vector comparison. Thus, the likelihood of a branch miss occurring is decreased.

Accordingly, using data from unmasked lanes to fill masked lanes enables vectorization of data sizes that are not powers of 2 (e.g., 3, 5, etc.), enabling vectorization even when the data partially fills a vector register. Vectorization can thus be performed without triggering exceptions due to filling the unused lanes with unvalidated data. The additional vectorization reduces costly branch misses, saving power and improving performance. This vectorization technique also decreases the number of cycles for executing the vectorized subroutines, due to added parallelism and the use of low latency instructions (e.g., PERMUTE and SHUFFLE) when performing the vectorization.

Figure 8:
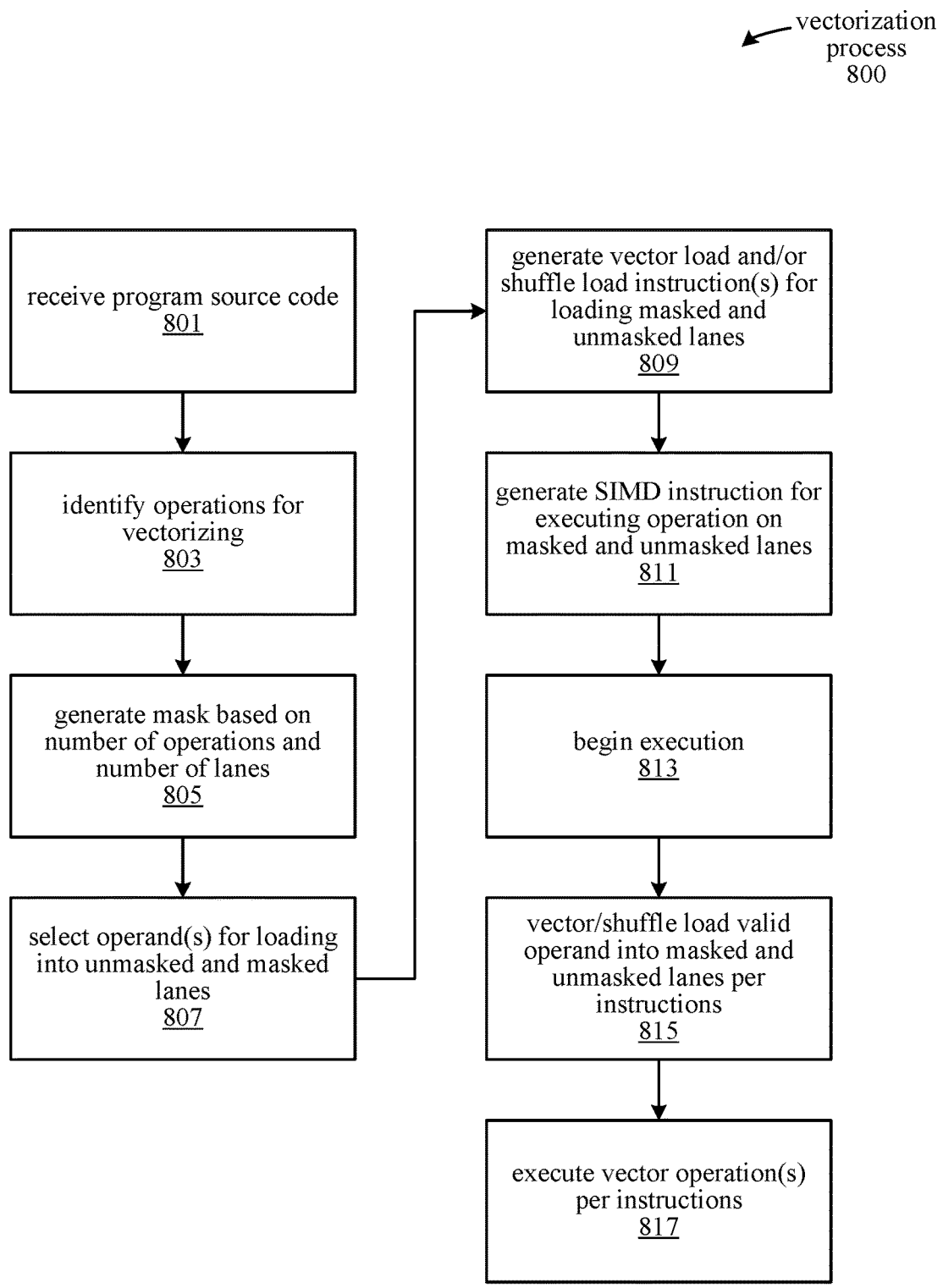
FIG. 8 illustrates a flow diagram for a process for vectorizing and executing a set of operations, according to an embodiment.

FIG. 8 is a flow diagram illustrating a process 800 for vectorizing operations in program source code, according to an embodiment. The process 800 is performed during execution of a compiler program by the components in computing system 500. In one embodiment, instructions 509 are executable by the processing unit 504 to perform the operations of the process 800.

At block 801, the compiler executed by the processing unit 504 receives the program source code to be compiled. During the compiling process, the compiler identifies a candidate set of operations for vectorizing, in which the operations in the set are all the same type of operation (e.g., addition, division, etc.). Each operation specifies a set of operands on which the operation is performed. For example, with reference to FIG. 7, the values of t1, t2, and t3 are all calculated by the same type of operation (i.e., division), so the compiler identifies this set of calculations as a candidate for vectorization. In response to identifying a set of operations suitable for vectorizing, the compiler performs the vectorization in blocks 805-811.

At block 805, the compiler generates a mask based on the number of operations in the candidate set of operations and a total number of lanes in each of the vector registers that will be used for the vector operation. The mask indicates the unmasked lanes in the vector registers to be used for storing valid operands, and the remaining unused lanes of the vector register are masked. In one embodiment, the total number of lanes in each vector register is a power of 2 (e.g., 16, 32, etc.) while the number of operations to be vectorized is fewer than the total number of lanes. Thus, the mask indicates at least one masked lane and at least one unmasked lane for each vector register.

In cases where each operation operates on two or more operands, additional vector registers are used to store the additional operands for each operation; for example, the vector division for calculating t1, t2, and t3 in FIG. 7 with two operands per division operation utilizes two vector registers 705 and 706. The generated mask also indicates which lanes are masked and unmasked in these additional vector registers. Lanes at corresponding positions in the vector registers are masked or unmasked together. Continuing the previous example, the leftmost lane position L4 in each of the registers 705 and 706 is masked, while the three rightmost lane positions L1-L3 are unmasked.

At block 807, values are selected for loading into the unmasked and masked lanes of the vector register or registers. Each operation in the set of operations being vectorized is assigned to a corresponding unmasked lane position; thus, the operands for each operation are loaded into the assigned lane position in respective vector registers. With reference to FIG. 7, for the operations for calculating t1, t2, and t3 correspond to lanes L1, L2, and L3 in vector registers 705 and 706. Accordingly, the operands b[0] and c[2] for calculating t1 are loaded into lane position L1 of registers 705 and 706, respectively.

For each masked lane position, one of the valid operands is selected for loading into the masked lane on the basis that the operand was a valid selection (or can be validly selected) for loading into the unmasked lane. This ensures that no additional exceptions will arise from performing the vector operation on the filler values in the masked lanes. Continuing the previous example, the valid operands b[2] and c[0] are selected for loading into the masked lane position L4 of registers 705 and 706, since b[2] and c[0] were appropriately selected for loading into unmasked lane positions.

Based on the mask generated at block 805 and the selections at block 807, the compiler generates instructions at block 809 for loading the operand values into the unmasked and masked lanes of the vector registers. A padded vector load instruction is generated for cases in which operand values in an array are loaded in the same order into consecutive lanes of a vector register. For example, the padded vector load instruction 701 is generated for loading operand values b[0], b[1], and b[2] into consecutive lanes of vector register 705. A padded shuffle load instruction is generated for operand values to be loaded into a vector register in an order different from the array order. For example, the operand values c[2], c[1], and c[0] are loaded into lanes L1, L2, and L3 of vector register 706, respectively, via a padded shuffle load instruction 702.

Both of the padded vector load and padded shuffle load instructions additionally load one of the operands selected for loading into an unmasked lane into one or more masked lanes. For example, the padded vector load 701 and padded shuffle load 702 each load the masked lane L4 in the respective vector registers 705 and 706 with the value from the unmasked lane L3 from these registers 705 and 706. In one embodiment, the masked and unmasked lanes in a vector register are thus loaded by a single instruction; alternatively, masked and unmasked lanes are loaded via multiple separate instructions.

At block 809, the compiler generates a SIMD instruction to execute the vectorized operations in parallel on the operand values loaded in the unmasked and masked vector register lanes. For example, a division instruction is generated to divide each of the operands in register 705 with operands in corresponding lanes of register 706. The division operation is performed on both the unmasked lanes and the masked lanes of registers 705 and 706.

In FIG. 7, the program source code 700 includes a set of comparison operations for which the compiler, at block 809, generates a vector comparison operation 711 and a vector bitwise logical OR (VPOR) 712 that performs an OR function on the results of the comparison 711.

In the case where a conditional branch (e.g., the if statement in the source code 700) depends on the result of a comparison operation, the number of branch prediction misses is reduced; vectorization reduces the number of conditional branches and thus the number of branch prediction misses because the comparisons need not be performed serially. In the example, the compiler generates the VPTEST and JNZ instructions 713 based on the if statement, which return a '1' or '0' depending on the vector comparison 711 and VPOR 712 results.

At block 813, after the compiler has finished compiling the program source code, the processing unit 504 begins executing the generated instructions. At block 815, the processing unit 504 executes the instructions previously generated at block 809 to perform the vector load and shuffle load to load valid operands into the masked and unmasked vector register lanes. At block 817, the processing unit 504 executes the instructions previously generated at block 811 to perform the one or more vector operations.

A computing system includes a processing unit and a memory storing instructions that, when executed by the processor, cause the processor to receive program source code in a compiler, identify in the program source code a set of operations for vectorizing, where each operation in the set of operations specifies a set of one or more operands, in response to identifying the set of operations, vectorize the set of operations by, based on the number of operations in the set of operations and a total number of lanes in a first vector register, generating a mask indicating a first unmasked lane and a first masked lane in the first vector register, based on the mask, generating a set of one or more instructions for loading into the first unmasked lane a first operand of a first operation of the set of operations, and loading the first operand into the first masked lane.

In the computing system, the total number of lanes in the vector register is a power of 2. The number of operations in the set of operations is fewer than the total number of lanes in the first vector register. Each operation in the set of operations corresponds to one of a plurality of unmasked lanes in the first vector register, where the plurality of unmasked lanes includes the first unmasked lane.

In the computing system, the set of one or more instructions includes a single instruction, multiple data (SIMD) instruction for executing the set of operations in parallel on data in at least the first unmasked lane and the first masked lane of the first vector register.

In the computing system, the mask indicates a second unmasked lane and a second masked lane in a second vector register, and the set of one or more instructions includes an instruction for loading a second operand of the first operation into the second unmasked lane and into the second masked lane.

In the computing system, the instructions, when executed by the processor, further cause the processor to generate a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

In the computing system, the instructions, when executed by the processor, further cause the processor to select the first operand for loading into the first masked lane based on a selection of the first operand for loading into the first unmasked lane.

In the computing system, each operation in the set of operations is a comparison operation. The instructions, when executed by the processor, further cause the processor to, based on the program source code, generate a conditional branch instruction dependent on comparison results of the set of operations.

A method includes receiving program source code in a compiler, identifying in the program source code a set of operations for vectorizing, wherein each operation in the set of operations specifies a set of one or more operands, in response to identifying the set of operations, vectorizing the set of operations by, based on the number of operations in the set of operations and a total number of lanes in a first vector register, generating a mask indicating a first unmasked lane and a first masked lane in the first vector register, based on the mask, generating a set of one or more instructions for loading into the first unmasked lane a first operand of a first operation of the set of operations, and loading the first operand into the first masked lane.

In the method, the total number of lanes in the vector register is a power of 2. The number of operations in the set of operations is fewer than the total number of lanes in the first vector register. Each operation in the set of operations corresponds to one of a plurality of unmasked lanes in the first vector register, where the plurality of unmasked lanes includes the first unmasked lane.

In the method, the set of one or more instructions includes a single instruction, multiple data (SIMD) instruction for executing the set of operations in parallel on data in at least the first unmasked lane and the first masked lane of the first vector register.

In the method, the mask indicates a second unmasked lane and a second masked lane in a second vector register. The set of one or more instructions includes an instruction for loading a second operand of the first operation into the second unmasked lane and into the second masked lane.

The method further includes generating a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

In the method, the set of one or more instructions includes an instruction for loading the first operand into a plurality of masked lanes in the first vector register, the plurality of masked lanes including the first masked lane.

The method further includes selecting the first operand for loading into the first masked lane based on a selection of the first operand for loading into the first unmasked lane.

In the method, each operation in the set of operations is a comparison operation. The method further includes, based on the program source code, generating a conditional branch instruction dependent on comparison results of the set of operations.

The method further includes generating the set of one or more instructions for performing a vector load of a first subset of operands from a first source register to the first vector register, where the vector load causes the first subset of operands to be stored in the first vector register in the same order as in the first source register, and performing a shuffle load of a second subset of operands from a second source register to a second vector register, where the shuffle load causes the second subset of operands to be stored in the second vector register in a different order than in the second source register.

A non-transitory computer readable storage medium stores instructions for a compiler. The instructions are executable by a processor to receive program source code in a compiler, identify in the program source code a set of operations for vectorizing, where each operation in the set of operations specifies a set of one or more operands, in response to identifying the set of operations, vectorize the set of operations by, based on the number of operations in the set of operations and a total number of lanes in a first vector register, generating a mask indicating a first unmasked lane and a first masked lane in the first vector register, and based on the mask, generating a set of one or more instructions for loading into the first unmasked lane a first operand of a first operation of the set of operations and loading the first operand into the first masked lane.

For the non-transitory computer readable storage medium, the set of one or more instructions includes a single instruction, multiple data (SIMD) instruction for executing the set of operations in parallel on data in at least the first unmasked lane and the first masked lane of the first vector register.

For the non-transitory computer readable storage medium, the mask indicates a second unmasked lane and a second masked lane in a second vector register. The set of one or more instructions includes an instruction for loading a second operand of the first operation into the second unmasked lane and into the second masked lane. The instructions are executable by the processor to generate a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

For the non-transitory computer readable storage medium, the instructions are executable by the processor to select the first operand for loading into the first masked lane based on a selection of the first operand for loading into the first unmasked lane.

For the non-transitory computer readable storage medium, each operation in the set of operations is a comparison operation. The instructions are executable by the processor to, based on the program source code, generate a conditional branch instruction dependent on comparison results of the set of operations.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 500 and/or portions thereof carried on the computer-readable storage medium may be a database or other data structure which can be read by a program and used, directly or indirectly, to fabricate the hardware including the computing system 500. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 500. The netlist may then be placed and routed to produce a data set describing geometric shapes to be applied to masks. The masks may then be used in various semiconductor fabrication steps to produce a semiconductor circuit or circuits corresponding to the computing system 500. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

The invention claimed is:

1. A computing system, comprising:
a processing unit; and
a memory storing a set of instructions that, when executed by the processing unit, cause the processing unit to:
vectorize a set of operations in a program source code received at a compiler, including:
based on a mask indicating a first unmasked lane and a first masked lane in a first vector register and a second unmasked lane and a second masked lane in a second vector register, generating one or more instructions for loading a first operand of a first operation of the set of operations into the first unmasked lane and into the first masked lane, and loading a second operand of the first operation of the set of operations into the second unmasked lane and into the second masked lane; and generating a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

2. The computing system of claim 1, wherein:
the total number of lanes in the first vector register is a power of 2;
the number of operations in the set of operations is fewer than the total number of lanes in the first vector register; and
each operation in the set of operations corresponds to one of a plurality of unmasked lanes in the first vector register, the plurality of unmasked lanes comprising the first unmasked lane.

3. The computing system of claim 1, wherein:
the set of one or more instructions comprises a single instruction, multiple data (SIMD) instruction; and
the SIMD instruction is for executing the set of operations in parallel on data in at least the first unmasked lane and the first masked lane of the first vector register.

4. The computing system of claim 1, wherein the instructions, when executed by the processor, further cause the processor to:
select the first operand for loading into the first masked lane based on a selection of the first operand for loading into the first unmasked lane.

5. The computing system of claim 1, wherein:
each operation in the set of operations is a comparison operation;
the instructions, when executed by the processor, further cause the processor to, based on the program source code, generate a conditional branch instruction dependent on comparison results of the set of operations.

6. A method for vectorizing a set of operations in a program source code, comprising:
in response to receiving source code at a compiler and based on a mask indicating a first unmasked lane and a first masked lane in a first vector register and a second unmasked lane and a second masked lane in a second vector register, generating one or more instructions for loading a first operand of a first operation of the set of operations into the first unmasked lane and into the first masked lane, and loading a second operand of the first operation into the second unmasked lane and into the second masked lane; and
generating a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

7. The method of claim 6, wherein:
the total number of lanes in the first vector register is a power of 2;
the number of operations in the set of operations is fewer than the total number of lanes in the first vector register; and
each operation in the set of operations corresponds to one of a plurality of unmasked lanes in the first vector register, the plurality of unmasked lanes comprising the first unmasked lane.

8. The method of claim 6, wherein:
the set of one or more instructions comprises a single instruction, multiple data (SIMD) instruction; and
the SIMD instruction is for executing the set of operations in parallel on data in at least the first unmasked lane and the first masked lane of the first vector register.

9. The method of claim 6, wherein:
the set of one or more instructions includes an instruction for loading the first operand into a plurality of masked lanes in the first vector register, the plurality of masked lanes comprising the first masked lane.

10. The method of claim 6, further comprising:
selecting the first operand for loading into the first masked lane based on a selection of the first operand for loading into the first unmasked lane.

11. The method of claim 6, wherein:
each operation in the set of operations is a comparison operation;
the method further comprises, based on the program source code, generating a conditional branch instruction dependent on comparison results of the set of operations.

12. The method of claim 6, further comprising generating the set of one or more instructions for:
performing a vector load of a first subset of operands from a first source register to the first vector register, wherein the vector load causes the first subset of operands to be stored in the first vector register in the same order as in the first source register; and
performing a shuffle load of a second subset of operands from a second source register to the second vector register, wherein the shuffle load causes the second subset of operands to be stored in the second vector register in a different order than in the second source register.

13. A non-transitory computer readable storage medium storing instructions for a compiler, wherein the instructions are executable by a processor to:
vectorize a set of operations in a program source code, including:
in response to receiving program source code at a compiler and based on a mask indicating a first unmasked lane and a first masked lane in a first vector register and a second unmasked lane and a second masked lane in a second vector register, generate one or more instructions for loading a first operand of a first operation of the set of operations into the first unmasked lane and into the first masked lane, and loading a second operand of the first operation of the set of operations into the second unmasked lane and into the second masked lane; and
generating a single instruction, multiple data (SIMD) instruction for performing the first operation on the first operand in the first unmasked lane and the second operand in the second unmasked lane in parallel with performing the first operation on the first operand in the first masked lane and the second operand in the second masked lane.

14. The non-transitory computer readable storage medium of claim 13, wherein:
the set of one or more instructions comprises a
SIMD instruction for executing the set of operations in parallel on data in at least the first unmasked lane and the first masked lane of the first vector register.

15. The non-transitory computer readable storage medium of claim 13, wherein the instructions are executable by the processor to:

select the first operand for loading into the first masked lane based on a selection of the first operand for loading into the first unmasked lane.

16. The non-transitory computer readable storage medium of claim 13, wherein:
each operation in the set of operations is a comparison operation; and
the instructions are executable by the processor to, based on the program source code, generate a conditional branch instruction dependent on comparison results of the set of operations.

\* \* \* \* \*